United States Patent [19]

Reeves

[11] Patent Number: 4,482,666
[45] Date of Patent: Nov. 13, 1984

[54] EMULSIONS OF LIQUID HYDROCARBONS WITH WATER AND/OR ALCOHOLS

[75] Inventor: Russell R. Reeves, Richmond, Australia

[73] Assignee: Apace Research Limited, Richmond, Australia

[21] Appl. No.: 471,536

[22] Filed: Mar. 2, 1983

[30] Foreign Application Priority Data

Mar. 12, 1982 [AU] Australia ............................... 3086/82
Nov. 30, 1982 [AU] Australia ............................... 7052/82

[51] Int. Cl.$^3$ .............................................. C08K 5/05
[52] U.S. Cl. .................................... 524/389; 524/475; 524/577; 524/801
[58] Field of Search ................. 524/389, 577, 475, 801

[56] References Cited

U.S. PATENT DOCUMENTS

| | | | |
|---|---|---|---|
| 3,839,258 | 10/1974 | Visseren et al. | 524/389 |
| 3,991,020 | 11/1976 | Alvares et al. | 524/577 |
| 4,002,435 | 1/1977 | Wenzel et al. | 44/51 |
| 4,083,698 | 4/1978 | Wenzel et al. | 44/51 |
| 4,083,895 | 4/1978 | Nnadi et al. | 252/356 |
| 4,173,455 | 11/1979 | Fodor et al. | 44/51 |
| 4,177,177 | 12/1979 | Vanderhoff et al. | 524/577 |
| 4,203,877 | 5/1980 | Baker | 524/500 |
| 4,336,032 | 6/1982 | Kupka et al. | 44/56 |
| 4,347,061 | 8/1982 | Madsen et al. | 44/51 |
| 4,362,838 | 12/1982 | Leep et al. | 524/389 |

FOREIGN PATENT DOCUMENTS

| | | |
|---|---|---|
| 1047357 | 1/1979 | Canada . |
| 53-136008 | 11/1978 | Japan . |
| 57-38890 | 3/1982 | Japan . |
| 2066288 | 7/1981 | United Kingdom . |

OTHER PUBLICATIONS

Patent Spec. 1,361,179 filed Jun. 16, 1970.
Colloid & Polymer Science 253,220, (1975).

*Primary Examiner*—Joseph L. Schofer
*Assistant Examiner*—N. Sarofin
*Attorney, Agent, or Firm*—Murray, Whisenhunt and Ferguson

[57] ABSTRACT

Emulsions of hydrocarbon liquids such as automotive distillate and water, or water and alcohols, are formed using an emulsifier which is a block copolymer of ethylene oxide type monomers and styrene type monomers. The stability of the emulsions is improved by the addition to the emulsion of a coupling agent which is soluble in the continuous phase of the emulsion and will couple with that portion of the emulsifier which is solvated by the continuous phase of the emulsion. Preferred coupling agents for water in oil type emulsions are copolymers of butadiene and styrene.

40 Claims, No Drawings

EMULSIONS OF LIQUID HYDROCARBONS WITH WATER AND/OR ALCOHOLS

The present invention relates to emulsions of liquid hydrocarbons with water and/or alcohols and to emulsifiers for the production of such emulsions.

It is known that emulsions of liquid hydrocarbons and water or solutions of water and alcohols can be formed using a variety of emulsifiers. These emulsions have been proposed for use as fuels and for other purposes. While the properties required from an emulsion will vary in accordance with the use to which it is to be put, in general the known emulsions have not been satisfactory as fuels for any one of a number of reasons. These include instability of the emulsion, high cost of the emulsifier, the quantity of emulsifier required to produce the emulsion and the production of polluting emissions when the emulsion is burnt.

The present invention relates to emulsions and emulsifiers which overcome at least some of the shortcomings of the previously known emulsions and emulsifiers. It is not necessary that all of the emulsions or emulsifiers within the scope of this invention overcome all of the difficulties encountered in the past. Emulsions of only short term stability might, for example, be useful in a situation where the emulsion is formed only shortly before use and a high priced emulsifier may be acceptable if it is used in small quantities.

The present invention consists in an emulsion having in one phase a hydrocarbon liquid and in the other phase water and/or an alcohol, characterized in that the emulsion contains an emulsifier comprising a block copolymer containing at least one polymeric block of at least one monomer selected from the group comprising styrene and ring substituted styrenes and at least one polymeric block of at least one monomer selected from the group having the formula:

$$H(O-R)_nOH$$

wherein
R is an aliphatic hydrocarbon radical containing from 1 to 4 carbon atoms and
n is a number between 4 and 4000

The present invention further consists in a method of forming an emulsion having in one phase a hydrocarbon liquid and in the other phase water and/or an alcohol comprising mixing the hydrocarbon liquid with the water and/or alcohol in the presence of an emulsifier comprising a block copolymer containing at least one polymeric block of at least one monomer selected from the group comprising styrene and ring substituted styrenes, and at least one polymeric block of at least one monomer selected from the group having the formula:

$$H(O-R)_nOH$$

where
R is an aliphatic hydrocarbon radical containing from 1 to 4 carbon atoms, and
n is a number of from 4 to 4000.

The present invention still further consists in an emulsifying preparation for use in the formation of emulsions containing a hydrocarbon liquid in one phase and water and/or an alcohol in the other phase, comprising an emulsifier which is a block copolymer containing at least one polymeric block of at least one monomer selected from the group comprising styrene and ring substituted styrenes and at least one polymeric block containing at least one monomer selected from the group having the formula:

$$H(O-R)_nOH$$

wherein
R is an aliphatic hydrocarbon radical containing from 1 to 4 carbon atoms,
n is a number between 4 and 4000 and a coupling agent which is soluble in the continuous phase of the emulsion which the emulsifying preparation is to be used to form, which is substantially insoluble in the discontinuous phase of such an emulsion and which will couple with that part of the emulsifier which is solvated by the continuous phase of such an emulsion.

In a still further aspect the present invention consists in a method for the preparation of an emulsifying preparation capable of stabilising emulsions containing a hydrocarbon liquid in one phase and water and/or an alcohol in the other phase, comprising mixing together (a) an emulsifier which is a block copolymer containing at least one polymeric block of at least one monomer selected from the group comprising styrene and ring substituted styrenes and at least one polymeric block containing at least one monomer selected from the group having the formula:

$$H(O-R)_nOH$$

wherein
R is an aliphatic hydrocarbon radical containing from 1 to 4 carbon atoms, and
n is a number between 4 and 4000, with (b) a coupling agent which is soluble in the continuous phase of the emulsion which the emulsifying preparation is to be used to form, which is substantially insoluble in the discontinuous phase of such an emulsion and which will couple with that part of the emulsifier which is solvated by the continuous phase of such an emulsion.

As used in this specification the following terms have the meanings indicated:

| | |
|---|---|
| Alcohol: | This term means methanol or ethanol or mixtures thereof. |
| Hydrocarbon Liquid: | This term includes all liquid fractions obtained from petroleum crude oil and synthetic liquid hydrocarbons obtained from the processing of gaseous or solid hydrocarbons. |

There are two types of emulsions covered by the present invention. The water and/or alcohol in hydrocarbon emulsions comprise a dispersed phase containing the water and/or alcohol and a continuous phase containing the hydrocarbon liquid. These emulsions are hereinafter called AW/D emulsions. The hydrocarbon in water and/or alcohol emulsions comprise a dispersed phase containing the hydrocarbon liquid and a continuous phase containing the water and/or alcohol. These emulsions are hereinafter called D/AW emulsions.

The emulsions according to the present invention preferably include either water and no alcohol or alcohol which contains from 0 to 10% by volume of water. In the former case the emulsions may be used as fuels which under certain circumstances show improved combustion efficiency over the unemulsified hydrocarbon liquid. In the latter cases the emulsions may be used as fuels in which the alcohol contributes to the calorific value of the fuel.

The hydrocarbon liquid is preferably selected from the gasolines which have boiling points below 190° C., the kerosenes which have boiling points between 190° and 230° C., the diesels oils which have boiling points from 230° to 315° C. and the gas oils which have boiling points from 315° to 480° C. The invention is particularly applicable to the high boiling point kerosenes, the diesel oils and the low boiling point gas oils when the other phase of the emulsion contains alcohol with or without water. In the case where the non-hydrocarbon phase contains only water the preferred hydrocarbon liquids are the diesel oils, the gas oils and hydrocarbon liquids with boiling points above 480° C.

The proportions of water and/or alcohol to hydrocarbon liquid may vary over wide limits. The nature of the emulsion, i.e. whether it is an AW/D emulsion or a D/AW emulsion, will however depend to a considerable extent on the relative proportions of the hydrocarbon liquid and of the water and/or alcohol. Water contents of up to 10% by volume are preferred for non-alcohol containing emulsions. For alcohol containing emulsions an alcohol and water content between 10 and 30% by volume is preferred.

The essential emulsifiers according to this invention are those which are block copolymers of styrene or ring substituted styrenes together with monomers selected from the group having the formula $H(O-R)_nOH$, where R is an aliphatic hydrocarbon radical containing from 1 to 4 carbon atoms and n is from 4 to 4000.

The block copolymers may comprise a single polymeric block of each monomer or there may be a plurality of blocks of one or both monomers. Any one block may contain one or more monomers of the defined type. It is preferred that the two types of monomers are present in the block copolymer in a weight ratio of from 1:5 to 5:1, most preferably 1:2 to 2:1. The block copolymer may include monomeric species other than those described above provided the essential character of the block copolymer is not changed. It has been found for instance that a block of propylene oxide monomer up to 20% by weight of the non-styrene monomer may be included in the block copolymer.

The first monomer comprises styrene or a ring substituted styrene. The preferred ring substituted styrenes are those in which the substituents do not include elements other than carbon, hydrogen or oxygen. After styrene itself the most preferred monomers in this group are those in which the substituent is an aliphatic hydrocarbon radical, particularly a saturated aliphatic hydrocarbon, having no more than 4 carbon atoms.

The preferred polymers formed from this other group of monomers are the polyethylene oxides (also known as polyethylene glycols). These compounds have the formula:

$$H(OCH_2CH_2)_nOH$$

where n is a number from 5 to 3400.

The particularly preferred polyethylene oxides are those having molecular weights from 200 to 150,000. The shorter chain length polyethylene oxides i.e. those having molecular weights between 5,000 and 15,000 and in which n is a number from 110 to 340, appear to be particularly effective.

If desired one end of the polyethylene glycol or like polymer may be esterified to form a half-ester prior to grafting on the styrene or like monomer to form the block copolymer. The formation of the half-ester prevents styrene being grafted to the esterified end of the polyethylene oxide type polymer. The esterification is believed to enhance the affinity of the polyethylene oxide type moiety of the copolymer for the water/alcohol phase of the emulsion. The preferred half-esters are those in which the polymer is esterified with acetic acid or acetic anhydride.

Other polymers which may be used instead of the polyethylene oxides half-esters include the water soluble polyoxyalkylene glycol ether group of compounds sold under the trade name "ICINOL" (Registered Trade Mark) and which have the general formula:

$$R(OCH_2CH_2)_nOH$$

where R=methyl or ethyl and n is as defined above.

It is believed that upon the formation of the emulsions the polyethylene oxide type polymer is solvated by the water and/or alcohol phase while the styrene type polymer is solvated by the hydrocarbon liquid phase. Many of the emulsions according to this invention have only short term stability. This is believed to be due, in the case of AW/D emulsions, to the failure of the solvated styrene type polymer moiety of the emulsifier to couple with the excess hydrocarbon liquid or, in the case of D/AW emulsions, of the solvated polyethylene oxide type polymer moiety of the emulsifier to couple with the excess water or alcohol. The natural density difference between the hydrocarbon liquid and the water and/or alcohol will lead to a settling or rising of the dispersed phase. The essentially non-labile nature of the surfactant may be observed as the dispersed phase does not coalesce but remains dispersed notwithstanding the rising or settling that has taken place.

The stability of the emulsions according to this invention may be enhanced by adding to the emulsion a coupling agent which is soluble in the continuous phase of the emulsion, which is substantially insoluble in the discontinuous phase of the emulsion and which will couple with that part of the emulsifier which is solvated by the continuous phase. The exact nature of the coupling between the emulsifier and the coupling agent is not known. It is probably by way of the formation of strong polar or hydrogen bonds between the polymer moieties in the continuous phase. The preferred coupling agents in the case of AW/D emulsions are block or random copolymers of butadiene and styrene. The copolymers of butadiene and styrene preferred are those containing butadiene and styrene in weight ratios of at least 2:1, most preferably at least 3:1. The preferred molecular weight of the butadiene/styrene copolymers are from 50,000 to 500,000, most preferably 80,000 to 350,000. The butadiene/styrene copolymers sold under the Registered Trade Marks Solprene 1204 and Solprene 1205 are particularly suitable for use as coupling agents in the present emulsions when they are of the AW/D type.

The poly(ethylene oxide-styrene) block copolymer and the poly(butadiene-styrene) copolymers are preferably present in a weight ratio of from 1:3 to 3:1, most preferably 2.3:1.

The properties of the emulsion according to this invention will depend to some extent upon the method used to physically form the emulsion. In some cases simple shaking may be sufficient however in other cases mechanical mixing or homogenisation is preferred.

The poly(ethylene oxide-styrene) block copolymer and the poly(butadiene-styrene) copolymers may be introduced into the mixture of ingredients to be emulsified as pure or essentially pure compounds. It is, however, preferred to add these copolymers as "active solutions" containing the reaction ingredients from which the copolymers have been produced. This technique facilitates dispersion of the copolymers in the emulsion; avoids handling solid materials; and avoids solvent recovery problems.

The poly(ethylene oxide-styrene) block copolymers are preferably added to the emulsion ingredients in an amount of from 0.1% w/v to 1% w/v. The poly(butadiene-styrene) copolymers are preferably added in an amount of from 0.1% w/v to 0.5% w/v. The exact amounts will depend upon the mixing method and the emulsion ingredients. For example, for a mixture of 20% by volume of ethanol containing 5% by volume water and 80% by volume automotive distillate simple manual shaking required 0.6% w/v of an acetylated poly(ethylene oxide-styrene) block copolymer and 0.2% w/v Solprene 1205. When a medium speed low shear stirrer was used, however, only 0.39% w/v of the acetylated block copolymer and 0.17% w/v Solprene 1205 was required.

The following Example 1 is given to illustrate the preparation of a preferred poly(ethylene oxide-styrene) block copolymer emulsifier for use in forming emulsions according to this invention.

EXAMPLE 1

Polyethylene oxide of molecular weight 6,000 (180 grams) was disolved in BTX (169 parts Benzene, 27 parts Toluene, 4 parts Xylene) (280 mls) by slight warming in a 1 (one) liter, three necked, round bottom flask mounted in a heating mantle. Benzoyl peroxide (14 grams) was then added and the mixture refluxed for 20 (twenty) minutes. After this time, benzoyl peroxide (19 grams), dissolved in styrene (199 ml) and ethyl acetate (15 ml) was added dropwise (drop rate approx. 2 drops per second) to the refluxing mixture. After the addition of the styrene was complete refluxing of the reaction mixture was continued for 60 (sixty) minutes, and then allowed to cool to room temperature. The resultant block copolymer reaction mixture contains 0.553 grams polymers/ml and 0.430 ml BTX/ml. This reaction mixture solution was then used without further work-up.

EXAMPLE 2

A suitable poly(butadiene-styrene) copolymer for use as a coupling agent in the preparation of AW/D emulsions using the emulsifier of Example 1 was prepared by dissolving 220 g of Solprene 1205 in 500 ml of a 1:1 mixture of BTX and automotive distillate.

The resultant solution comprised:
0.304 g polymer/ml
0.345 distillate/ml
0.345 ml BTX/ml

EXAMPLE 3

For the preparation of an ethanol/distillate AW/D type emulsion containing 15% by volume of ethanol where the ethanol contains 5% by volume of water, a suitable emulsifying preparation was prepared first by mixing 2.71 liters of the poly(ethylene oxide-styrene) block copolymer emulsifier solution of Example 1 with 2.5 liters of the poly(butadiene-styrene) copolymer coupling agent solution of Example 2 and an additional 2 liters of automotive distillate added.

The resultant emulsifying preparation solution comprised:
312 g emulsifying preparation/liter
397 ml automotive distillate/liter
281 ml BTX/liter The ratio of poly(ethylene oxide-styrene) block copolymer to poly(butadiene-styrene) copolymer in the emulsifier solution was 2:1.

Approximately 100 liters of a 15% ethanol/distillate emulsion was then prepared as follows:

To 84.24 liters of automotive distillate was added, with stirring, 1.92 liters of the emulsifying preparation solution. Fifteen liters of ethanol containing 5% by volume water was then added to the distillate/emulsifying preparation mixture with rapid stirring. The resultant ethanol/distillate emulsion was then stirred rapidly for a further three minutes, to ensure a uniform dispersion of the hydrated ethanol throughout the continuous distillate phase.

The above ethanol/distillate emulsion, which contained approximately 0.6% W/V or 6 grams of emulsifying preparation per liter of emulsion, showed good stability and was used as fuel for a diesel engine with the following results:

EXAMPLE 4

A fully instrumented Perkins 6.354.4 diesel engine mounted on a Schenk Model No. WS 450 dynamometer was tested of the emulsion fuel of Example 3. All the monitored parameters indicated that the thermodynamic performance of the unmodified engine was satisfactory over the entire speed-load range. Compared with engine operation on 100% automotive distillate, power and torque output decreased by approx. 5%, thermal efficiency increased by approx. 2%, exhaust temperatures were lower and $NO_x$ emissions were dramatically decreased when the engine was operated on the emulsion fuel. In durability trials with the same engine using the emulsion fuel there was no adverse effect on engine components or fuel injection equipment.

Unmodified diesel engines have been shown to give satisfactory performance when operated on AW/D type emulsion fuel containing up to 20% by volume of hydrated alcohol.

If it is desired to use an esterified poly(ethylene oxide-styrene) block copolymer as the emulsifier this may be prepared in the following manner:

EXAMPLE 5

Polyethylene glycol of molecular weight 6,000 (180 grams) was dissolved in pyridine (150 ml) by slight warming in a one (1) liter, three-necked, round bottom flask mounted in a heating mantle. The solution was then refluxed and all residual water was removed. Acetic anhydride (2.82 ml, $3 \times 10^{-2}$ moles) was then added, and the solution refluxed for 15 (fifteen) minutes. Benzoyl peroxide (14.0 grams) was then added and the mixture refluxed for a further 20 (twenty) minutes.

After this time, benzoyl peroxide (18.0 grams) dissolved in styrene (199 ml) and ethyl acetate (15 ml) was added dropwise (drop rate approx. 2 drops per second) to the refluxing mixture.

After the addition of the styrene was complete, the mixture was cooled to approx. 10° C. by swirling the flask in an ice bath. The mixture was then poured into diethyl ether (approx. 2 liters) at approx. 0° C. (ice-NaCl bath) and stirred vigorously with a stirring rod until the product precipitated as a finely divided solid.

The product was then filtered off on a Buchner funnel, washed with a little cold diethyl ether, and dried under vacuum at room temperature.

The product was then used without further purification. Yield: 314 grams.

This Example resulted in the production of a finely divided solid however the active reaction solution could have been used. This procedure results in a random esterification and there will not be 100% production of half ester.

The foregoing Examples of emulsions have been of the AW/D type. While emulsions of this type show the most immediate commercial applicability the emulsifiers according to this invention may also be used to produce emulsions of the D/AW type.

Rather than the poly(butadiene-styrene) copolymers the coupling agents of particular applicability with D/AW type emulsions are poly(ethylene oxide-vinyl acetate) or poly(ethylene oxide-vinyl alcohol) copolymers. It has also been noted that an increased proportion of water in the alcohol phase lends stability to D/AW type emulsions.

The prefered D/AW type emulsions for use as fuels are those containing 50% by volume or greater of hydrated alcohol.

The successful use of these D/AW emulsion fuels however requires either substantial modifications to be made to the diesel engine or the addition of a suitable cetane/ignition improver to the emulsion fuel in order to improve its auto-ignition quality.

It is within the scope of the present invention to replace the polymer moiety formed from monomers having the formula $H(O-R)_nOH$ with a polymer moiety formed from a polar monomer containing a vinyl radical i.e. the group $-CH=CH_2$. Preferred monomers include the acrylic monomers. Particularly preferred monomers are vinylacetate, vinylalcohol and the alkyl methacrylates particularly methyl methacrylate and ethyl methacrylate. The degree of polarity of the monomers should be sufficient for the polymeric moiety to be salvated by the water and/or alcohol phase of the emulsion.

It is further within the scope of this invention to replace the polymer moiety formed from styrene or substituted styrene monomers with a polymer moiety formed from diene monomers, i.e. monomers containing two carbon-carbon double bonds, which contain the two carbon-carbon double bonds on either side of a carbon-carbon single bond. Preferred monomers include butadiene and isoprene.

I claim:

1. An emulsion having in one phase a hydrocarbon liquid and in the other phase water and/or an alcohol, characterised in that the emulsion contains an emulsifier comprising a block copolymer containing at least one polymeric block of at least one monomer selected from the group comprising styrene and ring substituted styrenes and at least one polymeric block of at least one monomer selected from the group having the formula:

$$H(O-R)_nOH$$

wherein
R is an aliphatic hydrocarbon radical containing from 1 to 4 carbon atoms, and
n is a number between 4 and 4000.

2. An emulsion as claimed in claim 1 in which the one phase containing the hydrocarbon liquid is the continuous phase of the emulsion and the other phase containing water and/or an alcohol is the discontinuous phase of the emulsion.

3. An emulsion as claimed in claim 1 in which the other phase of the emulsion contains an alcohol and water, the water being present in an amount of from 0 to 10% by volume of the alcohol.

4. An emulsion as claimed in claim 1 in which the hydrocarbon liquid has a boiling point of from 190° C. to 480° C.

5. An emulsion as claimed in claim 4 in which the hydrocarbon liquid has a boiling point of 230° C. to 315° C.

6. An emulsion as claimed in claim 2 in which the discontinuous phase of the emulsion contains water and no alcohol, the discontinuous phase being present in an amount of from 1 to 10% by volume of the emulsion.

7. An emulsion as claimed in claim 1 in which the two types of monomer are present in the emulsifier in a weight ratio of from 1:2 to 2:1.

8. An emulsion as claimed in claim 1 in which the emulsifier comprises a single polymeric block of each monomer.

9. An emulsion as claimed in claim 1 in which the emulsifier comprises at least two polymeric blocks of at least one type of monomer and at least one polymeric block of the other type of monomer.

10. An emulsion as claimed in claim 1 in which the emulsifier comprises a block copolymer containing at least one polymeric block of at least one monomer selected from the group comprising styrene and ring substituted styrenes in which the or each substituent group is an aliphatic hydrocarbon radical containing from 1 to 4 carbon atoms, and at least one polymeric block of at least one monomer having the formula:

$$H(OCH_2CH_2)_nOH$$

where n is a number from 5 to 3400.

11. An emulsion as claimed in claim 10 in which n is a number from 110 to 340.

12. An emulsion as claimed in claim 1 in which one end of the polymeric block of monomers selected from the group having the formula $H(O-R)_nOH$ is esterified prior to being joined to the polymeric block of the other monomer.

13. An emulsion as claimed in claim 1 in which the emulsion also contains a coupling agent which is soluble in the continuous phase of the emulsion, which is substantially insoluble in the discontinuous phase of the emulsion, and which will couple with that part of the emulsifier which is solvated by the continuous phase of the emulsion.

14. An emulsion as claimed in claim 13 in which the coupling agent is a copolymer of butadiene and styrene.

15. An emulsion as claimed in claim 14 in which the butadiene and styrene are present in the coupling agent in a weight ratio of at least 2:1.

16. An emulsion as claimed in claim 14 in which the coupling agent has a molecular weight of 50,000 to 500,000.

17. An emulsion as claimed in claim 14 in which the emulsifier and the coupling agent are present in the emulsion in a weight ratio of from 1:3 to 3:1.

18. An emulsion as claimed in claim 1 in which the emulsifier is present in the emulsion in a weight ratio of from 0.1% W/V to 1% W/V.

19. A method of forming an emulsion having in one phase a hydrocarbon liquid and in the other phase water and/or an alcohol, comprising mixing the hydrocarbon liquid with the water and/or alcohol in the presence of an emulsifier comprising a block copolymer containing at least one polymeric block of at least one monomer selected from the group comprising styrene and ring substituted styrenes, and at least one polymeric block of at least one monomer selected from the group having the formula:

$$H(O-R)_nOH$$

wherein
R is an aliphatic hydrocarbon radical containing from 1 to 4 carbon atoms, and
n is a number of from 4 to 4000.

20. A method as claimed in claim 19 in which the one phase containing the hydrocarbon liquid is the continuous phase of the emulsion and the other phase containing water and/or an alcohol is the discontinuous phase of the emulsion.

21. A method as claimed in claim 19 in which the other phase of the emulsion contains an alcohol and water, the water being present in an amount of from 0 to 10% by volume of the alcohol.

22. A method as claimed in claim 19 in which the hydrocarbon liquid has a boiling point of from 190° C. to 480° C.

23. A method as claimed in claim 22 in which the hydrocarbon liquid has a boiling point of 230° C. to 315° C.

24. A method as claimed in claim 20 in which the discontinuous phase of the emulsion contains water and no alcohol, the discontinuous phase being present in an amount of from 1 to 10% by volume of the emulsion.

25. A method as claimed in claim 19 in which the two types of monomer are present in the emulsifier in a weight ratio of from 1:2 to 2:1.

26. A method as claimed in claim 19 in which the emulsifier comprises a single polymeric block of each monomer.

27. A method as claimed in claim 19 in which the emulsifier comprises at least two polymeric blocks of at least one type of monomer and at least one polymeric block of the other type of monomer.

28. A method as claimed in claim 19 in which the emulsifier comprises a block copolymer containing at least one polymeric block of at least one monomer selected from the group styrene and ring substituted styrenes in which the or each substituent group is an aliphatic hydrocarbon radical containing from 1 to 4 carbon atoms, and at least one polymeric block of at least one monomer having the formula:

$$H(OCH_2CH_2)_nOH$$

where n is a number from 5 to 3400.

29. A method as claimed in claim 28 in which n is a number from 110 to 340.

30. A method as claimed in claim 19 in which one end of the polymeric block of monomers selected from the group having the formula $H(O-R)_nOH$ is esterified prior to being joined to the polymeric block of the other monomer.

31. A method as claimed in claim 19 in which the emulsion also contains a coupling agent which is soluble in substantially the continuous phase of the emulsion which is insoluble in the discontinuous phase of the emulsion and which will couple with that part of the emulsifier which is solvated by the continuous phase of an emulsion produced by the present method.

32. A method as claimed in claim 31 in which the coupling agent is a copolymer of butadiene and styrene.

33. A method as claimed in claim 32 in which the butadiene and styrene are present in the coupling agent in a weight ratio of at least 2:1.

34. A method as claimed in claim 31 in which the coupling agent has a molecular weight of 50,000 to 500,000.

35. A method as claimed in claim 31 in which the emulsifier and the coupling agent are present in the emulsion in a weight ratio of from 1:3 to 3:1.

36. A method as claimed in claim 19 in which the emulsifier is present in the emulsion in a weight ratio of from 0.0% W/V to 1% W/V.

37. An emulsion as claimed in claim 1 in which the emulsifier is such that polymer moiety formed from monomers having the general formula $H(O-R)_nOH$ is replaced by a polymer moiety formed from a polar monomer containing a vinyl radical, the degree of polarity of the monomer being such that the polymer moiety will be solvated by the water and/or alcohol phase of the emulsion.

38. An emulsion as claimed in claim 37 in which the polar monomer is selected from the group comprising vinyl acetate, vinyl alcohol and the alkyl methacrylates.

39. An emulsion as claimed in claim 1 in which the emulsifier is such that the polymer moiety formed from styrene or a ring substituted styrene is replaced by a polymer moiety formed from a diene monomer which contains two carbon-carbon double bonds on either side of a carbon-carbon single bond.

40. An emulsion as claimed in claim 39 in which the diene monomer is selected from the group comprising butadiene and isoprene.

* * * * *